United States Patent [19]

Selsam

[11] Patent Number: 4,722,417

[45] Date of Patent: Feb. 2, 1988

[54] SEISMIC WAVE GENERATION BY A DOWNHOLE SOURCE

[75] Inventor: Roger L. Selsam, Rochester, N.Y.

[73] Assignee: Hydroacustics, Inc., Rochester, N.Y.

[21] Appl. No.: 874,785

[22] Filed: Jun. 13, 1986

Related U.S. Application Data

[63] Continuation of Ser. No. 537,200, Sep. 29, 1983, abandoned.

[51] Int. Cl.⁴ .................... G01 1/04; G01 1/40
[52] U.S. Cl. .................... 181/119; 181/106; 181/401; 367/912
[58] Field of Search ........ 181/104, 106, 108, 110–113, 181/116–120, 401, 402; 367/36, 37, 57, 75, 83–85, 143, 189, 911, 912; 166/66

[56] References Cited

U.S. PATENT DOCUMENTS

| | | | | |
|---|---|---|---|---|
| 2,281,751 | 5/1942 | Cloud | | 181/106 |
| 3,346,066 | 10/1967 | Miller, Jr. et al. | | 181/106 |
| 3,390,737 | 7/1968 | Johnson | | 181/106 |
| 3,642,089 | 2/1972 | Parker et al. | | 181/120 |
| 3,718,204 | 2/1973 | Groenendyke | | 367/69 |
| 3,718,205 | 2/1973 | Fair et al. | | 181/106 X |
| 3,730,269 | 5/1973 | Galle | | 166/177 |
| 3,979,140 | 9/1976 | Silverman et al. | | 181/120 |
| 4,042,063 | 8/1977 | Waters | | 181/119 |
| 4,252,209 | 2/1981 | Silverman | | 181/106 |
| 4,252,210 | 2/1981 | Sodich | | 181/120 X |
| 4,380,806 | 4/1983 | Waters et al. | | 367/75 X |
| 4,383,591 | 5/1983 | Oguara | | 181/106 |

FOREIGN PATENT DOCUMENTS 2376422  9/1978  France .................. 181/106

Primary Examiner—Deborah L. Kyle
Assistant Examiner—Brian S. Steinberger
Attorney, Agent, or Firm—Martin LuKacher

[57] ABSTRACT

A method and apparatus for downhole source generation of seismic waves of adjustable frequency by isolating a volume of liquid in a bore hole and cyclically varying the volume by a hydraulically operated transforming piston which varies the pressure of the volume thereby displacing the surrounding strata to generate waves.

11 Claims, 1 Drawing Figure

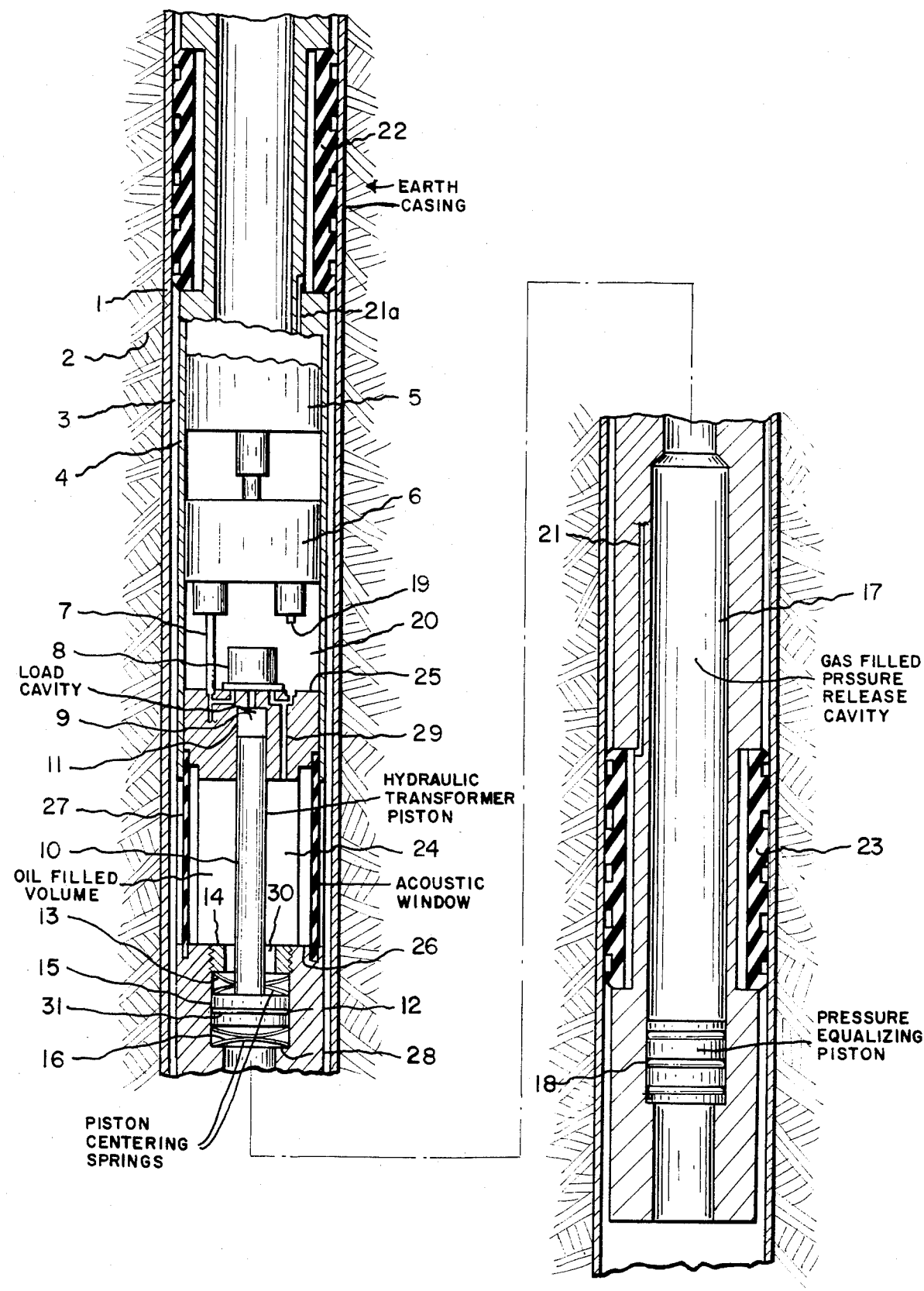

SEISMIC WAVE GENERATION BY A DOWNHOLE SOURCE

DESCRIPTION

This is a continuation of application Ser. No. 537,200, filed Sept. 29, 1983.

This invention relates to the field of generation of seismic waves by downhole sources. Such sources are useful in performing vertical seismic profiling and the production of other geologic data on surrounding strata. Waves generated by downhole sources typically result from triggered explosions or mechanical displacement of the surrounding hole casing and strata. The primary problem caused by the former method is the resulting physical deformation of the hole and strata, and subsequent loss of further use of the hole. The primary problem with the mechanical displacement is the relatively high frequencies and limited energy of the waves and consequently the distance at which such waves can reliably be detected (both vertically and horizontally).

A variety of means exist for achieving mechanical displacement in bore holes. Sodich, U.S. Pat. No. 4,252,210, describes a downhole source wherein a "packer" is expandably applied by high pressure against the hole casing, and includes means to hydraulically cycle the high pressure creating a mechanically deforming motion on the surrounding strata. Fair, et. al., U.S. Pat. No. 3,718,204, describe a single "shoe" which is biased against the hole within which a metal bellows hydraulically drives the shoe against the wall. Silverman, U.S. Pat. Nos. 3,979,140, and 4,252,209, describes a single-shot means to suddenly release stored compressed gas or fluid into the surrounding volume deforming the surrounding volume in one action. Hardee, *Geophysical Prospecting*, 31, 57–71 (1983), describes the theoretical aspects of downhole operation and summarizes several of the above types of devices as illustrations. Ogura, U.S. Pat. No. 4,383,591 also shows a downhole source which uses a fluid for transmitting percussively generated acoustic pulses.

None of these, however, provide for continuous, cyclic volumetric displacement of an acoustically isolated volume surrounding a device by which seismic waves are generated at low frequency more conducive to transmission at distance through strata.

As such, it is an object of this invention to provide improved means to generate low frequency seismic waves by volumetric displacement in which a power source hydraulically drives a piston shaft at pressure causing the piston head to displace downwardly through fixed volume, against resistance, thereby displacing the surrounding fixed volume and generating a wave in the coupled strata limited to an area between two acoustic packing devices.

A second aspect of this invention is the placement of said packing devices sufficiently apart as to be one half the wavelength of the speed of sound in the strata, at the highest frequency of interest, and sufficiently biased against the surrounding casing to isolate the surrounding volume, but not as to lock the apparatus into a rigidly fixed position or causing deformation of the surrounding strata.

A further aspect of this invention is to provide a hydraulically driven piston which may be efficiently driven at desired frequencies and which steps-down the pressure from that needed to drive the piston to that which generates the desired low frequency waves.

An additional aspect of this invention is to provide means to isolate the head of the driving piston from the surrounding volume of, for example, drilling mud, but not lose the volumetric displacement ability, as by flexural diaphragms or "windows" allowing volumetric displacement communication between the external mud and an internal liquid or oil filled chamber.

Another aspect of this invention is to provide means to resist the hydraulic piston at operating depth ambient pressure by providing a pre-charged chamber biased against the hydraulic piston and a second piston exposed to ambient pressure, as by being at the open bottom end of the chamber; the chamber pressure being responsive to the pressure depth, thus placing the whole system at ambient pressure, but which chamber and exposed piston will not be displaced by cycling pressures.

Still another aspect of this invention is to provide means to allow the liquid or oil filled chamber, if so used, to adjust to ambient pressure a liquid or oil filled reservoir for the hydraulic pumping means.

These and other objects, features, aspects and advantages of this invention, as well as a presently preferred embodiment thereof, will become more apparent as the discussion continues in connection with the accompanying drawings in the sole FIGURE elevational view of the apparatus in section.

Referring to the FIGURE, the downhole source device is inserted at the surface into a bore hole having a standard casing 1 surrounded by strata 2. The casing may, for example, have an inner diameter of 4 inches which will accommodate the body of the device, which is generally cylindrical and 3.75 inches diameter. There is, thus, sufficient room to allow liquid, usually drilling mud, to form an annulus 3 between an outer wall 4 of the device and the casing 1.

The device is attached to an lowered by a cable into the hole (not shown). Means (not shown) is provided to transfer energy to a motor 5, such as by electric leads which may also be coaxial with the cable and with other sensing or remote control devices. The motor 5 provides energy to and drives a hydraulic pump 6. The pump outputs, through a line 7, fluid, preferably hydraulic oil, to a three-way servo valve 8. If frequencies of wave generation are sought up to 200 Hz, the pressure of the oil supplied to said valve must be relatively high (e.g., 1000 psi or more).

When the servo valve 8 is in the first position, oil is pumped to a load cavity 9. The load cavity 9 is defined by the shaft end of a piston 10, and a sheath 11 formed around said shaft 10. The head 12 of said piston extends beyond the sheath 11 into a head sheath 15 and is positioned by two centering springs. The upper spring 13 and the lower spring 16 maintain the position of the piston head between a nut 14 and the shoulder 28. An "O" ring 31 in the head 12 improves the seal in the sheath 15.

A gas filled cavity 17 in the body of the device may be pre-charged as with compressed air, for example, so that it is approximately 6 inches long when the ambient pressure is 20,000 psi; this volume providing a sufficient pressure release for the nominal case.

In one embodiment, the return of oil from the load cavity 9 is back through the servo valve 8 when switched to its second or return position. The output is then returned to the pump 6 via a line 19.

There may be a small, restrictive, pressure equalizing line 29 between the reservoir 20 and a chamber 24. In an alternative embodiment, line 29 is eliminated, and a separate, pressure equalizing reservoir is provided.

The gas cavity 17 acts as a pressure release for lower face of the piston head 12. The movable, pressure equalizing piston 18 serves to keep the average pressure in the gas cavity equal to the ambient pressure. As the servo value 8 switches the pressure in the load cavity 9 from supply to return in a programmed manner, the piston 10 reciprocates. This forces fluid back and forth through another annulus 30 formed by the piston 10 and the bore in the nut 14 to the fluid filled chamber 24. In the preferred embodiment, chamber 24 is filled with hydraulic fluid but separated from the drilling mud filled annulus 3 by an acoustically transparent flexural sleeve 27.

The hydraulic pump 6 also operates, before generating wave motion, to bias two packers 22 and 23, against the casing via two additional lines 21 and 21a which are connected to the supply line 7. The upper packer 22 and lower packer 23 are devices common in oil field use and expand in diameter to bias the device against the casing 1 (the wall of the bore hole). Pressure supplied to expand the packers is necessary only to block transmission of acoustic waves, it need not be and should not be set so high as to permanently deform the casing 1. The pressure necessary to set the packers may be reached as indicated by a time delay or by a pressure switch (not shown). The servo valve then starts operating to drive the load cavity 9.

It can be shown that the energy required to generate a given volume displacement in the medium (the strata) decreases as the area of force application increases. However, as the path length from the central chamber 24 to either end of the driven annulus 3 increases beyond one quarter wavelength in the drilling mud, the additional volume displacement is sufficiently shifted in phase that it does not contribute to the far field pressure signal. In overall design, therefore, it is important to select the distance between packers 22, 23 approximately one-half the wavelength of sound in drilling mud at the highest frequency of interest. Thus, for example, if the speed of sound in drilling mud is $1.5 \times 10^3$ m/sec and an upper frequency of 200 Hz is sought, the distance between the packers should be 3.75 m.

The wave itself initially is generated, in one embodiment, in the liquid or oil filled chamber 24 lying between the portions of the body of the device which provide support 25 for the servo valve 8 and a lower base 26, which extends outwardly from nut 14 to the outer wall 4. The oil or mud in the chamber 24, also therefore, extends down to said piston head 15 around upper centering spring 13. The sleeve 27, suitably of rubber, around the body and captured by its outer wall 4, provides a flexural diaphragm or window 27. The sleeve 27 effectively replaces a part of the outer wall 4; thus providing a flexible, annular, deformable surface between said oil chamber 24 and the drilling mud annulus 3. If a separate transfer barrier for the reserovir is not provided, an AC restriction line 29 (e.g., having an orifice not shown) is preferably provided between the chamber 24 and reservoir 20 to allow both to reach ambient pressure, while blocking wave transmission.

In another alternative embodiment, sleeve 27 is not present, allowing mud to replace oil in the chamber 24. In all embodiments, the total area ultimately employed to generate a wave is defined by the annulus 3 and extends from the upper packer 22 to the lower packer 23.

To generate a wave in the strata, servo valve 8 alternately connects the load cavity 9 to supply and return pressure (relatively high and relatively low pressures as provided by the pump 6). On the supply pressure half of the cycle, the servo valve 8 opens to allow pump 6 to output pressurized oil to the load cavity 9. Shaft 10 is thus downwardly biased, with head 12 depressing spring 16. Oil in the chamber 24, or mud itself, is withdrawn down into the increased volume created by the downward motion of head 12. In the embodiment with the flexible sleeve or diaphragm 27, the sleeve 27 flexes inwardly as the mud in the annulus 3 under ambient pressure pressed inward. The area of casing 1 between packers 22 and 23 is, thus, exposed to the lower pressure, inwardly deforming the casing. Equalizing piston 18 and the pressure of the gas in the gas filled cavity 17 provide support to spring 16 but does not oscillate in response to the downward motion of head 12.

When valve 8 switches to connect the load cavity 9 to return pressure (reservoir 20), pressure in the load cavity 9 decreases and the head 12 is biased upwardly by spring 16 forcing the oil or mud back to cavity 24 and annulus 3, causing the formation (strata) to move outwardly.

It will be apparent that by applying the high pressure necessary for efficient use of the servo valve 8 (approximately 1000 psi) to the small load cavity with a large head area, the pressure generated in the chamber 24 is greatly reduced but the volume displacement is increased. For example in an exemplary case, to transmit 800 watts to a 3.75 meter length of 4 inch I.D. hole in deep rock, the piston suitably transforms the pressure in a 1:6 ratio. This allows high pressure, low flow conditions necessary for efficient servo valve operation to be combined with low pressure, high flow conditions necessary to generate the desired waveform at appropriate levels at power.

The rate at which the waves are generated is variable by controlling the operation of servo valve 8. To maximize energy output, the preferred transmission is a pulse code or FM slide. The servo valve may vary the pressure to the load cavity 9 either linearly for FM operation or in a switching mode with a suitable pulse code.

From the foregoing discussion, it will be apparent that there has been provided for an improved apparatus for generating low frequency waves of sufficient energy capable of being detected at distance for vertical seismic profiling. Variations and modifications in the herein described apparatus, within the scope of the invention, will undoubtedly suggest themselves to those skilled in the art. Accordingly, the foregoing description should be taken as illustrative and not in a limiting sense.

I claim:

1. In a system for generating seismic waves in a bore hole in an earth formation, said hole containing drilling fluid, a downhole apparatus comprising a generally cylindrical body having a lower end and an upper portion and having an outer wall, the diameter of said body being less than the diameter of said bore hole, said diameters defining a first annulus comprising a fixed volume of drilling fluid surrounding said body, means on said body for acoustically isolating a portion of said annulus from the remainder of the fluid in said bore hole without deforming said earth formation, a liquid-filled cavity within said body, said cavity having an acoustically transparent window through said outer wall into said portion of said annulus, means within said cavity for generating acoustic waves in said liquid in said cavity which are transmitted from said cavity in a direction through said window to said portion of said annulus and then into said formation, said means for generating acoustic waves comprising a hydraulically operated piston reciprocally mounted in said body and exposed to liquid in said cavity, said piston having a shaft, said shaft having two ends, one of said ends having a head and being a head end and the other of said ends being a shaft end, means for hydraulically operating said piston which comprises a pump producing pressurized hydraulic fluid, and a servo valve connected by an output line to said pump for applying high hydraulic pressure at low flow to said shaft end of said piston.

2. The apparatus in claim 1 wherein the distance between said packers in one half the wavelength of said acoustic waves in said fluid in said portion of said annulus.

3. The apparatus in claim 2 wherein said distance is from 3.75 to 7.50 meters.

4. The apparatus in claim 1 wherein said shaft end is of small cross-section relative to said head end such that the high pressure, low flow output of said servo valve when applied to said shaft end generates a lower pressure, high flow output in said cavity by displacement of said head end.

5. The apparatus in claim 4 wherein said body further comprises an equalizing piston and a gas cavity, said gas cavity being disposed between said piston head end and said equalizing piston.

6. The apparatus in claim 4 wherein said liquid-filled cavity comprises an area defined: (a) by a support for mounting said servo valve; (b) a base with a central opening allowing passage therethrough of said piston shaft, the ends of said cavity being defined by said support and said base; (c) a nut disposed below said opening in said base defining a second annulus around said piston shaft; (d) said head end of said piston and (e) said window.

7. In a system for generating seismic waves in a bore hole in an earth formation, said hole containing a drilling fluid, a downhole apparatus comprising a generally cylindrical body having a lower end and an upper portion and having an outer wall, the diameter of said body being less than the diameter of said bore hole, said diameters defining a first annulus comprising a fixed volume of drilling fluid surrounding said body, means on said body for acoustically isolating a portion of said annulus from the remainder of said fluid in said bore hole without deforming said earth formation, a liquid-filled cavity within said body, said cavity having an acoustically transparent window through said outer wall into said portion of said annulus, and means within said cavity for generating acoustic waves in said liquid in said cavity which are transmitted from said cavity in a direction through said window to said portion of said annulus and thence into said formation, said means for generating acoustic waves comprising a hydraulically operated piston reciprocally mounted in said body and exposed to said liquid in said cavity, said piston having a shaft end and a head end, and biasing means for said piston located at said lower end of said body comprising an equalizing piston and a gas cavity, said gas cavity being disposed between said piston head end and said equalizing piston.

8. The apparatus in claim 7 wherein said means for acoustically isolating said portion of said annulus comprises expandable packers spaced along said body.

9. The apparatus in claim 7 which further comprises means for hydraulically operating said piston which comprises a pump producing pressurized hydraulic fluid and a servo valve connected by an output line to said pump applying high hydraulic pressure at low flow to said shaft end of said piston.

10. The apparatus in claim 7 wherein said shaft end of said piston is of small cross-section relative to said head end such that the high pressure, low flow output of said servo valve when applied to said shaft end generates a lower pressure, high flow output in said cavity by displacement of said head end.

11. The apparatus in claim 7 wherein said liquid-filled cavity comprises an area defined: (a) by a support for mounting said servo valve; (b) a base with a central opening allowing passage therethrough of said piston shaft, the ends of said cavity being defined by said support and said base; (c) a nut disposed below said opening in said base defining a second annulus around said piston shaft; (d) said head end of said piston and (e) said window.

* * * * *